UNITED STATES PATENT OFFICE.

ALFRED BERGDOLT, OF ELBERFELD, GERMANY, ASSIGNOR TO FARBENFABRIKEN VORM. FRIEDR. BAYER & CO., OF ELBERFELD, GERMANY, A CORPORATION OF GERMANY.

AZO DYE.

No. 912,356.      Specification of Letters Patent.      Patented Feb. 16, 1909.

Application filed September 22, 1908. Serial No. 454,211.

*To all whom it may concern:*

Be it known that I, ALFRED BERGDOLT, doctor of philosophy, chemist, citizen of the German Empire, residing at Elberfeld, Germany, have invented new and useful Improvements in new Azo Dyes, of which the following is a specification.

I have found that a new and valuable azo-dyestuff is obtained by combining the diazo compound of the sulfurous acid ester of 1.8-aminonaphthol (see United States Letters Patent 716,289) with 1.8-dioxynaphthalene-4-sulfonic acid and splitting off the sulfurous acid residue from the dyestuff.

In carrying out the new process practically I can proceed as follows, the parts being by weight: 223 parts of the sulfurous acid ester of 1.8-aminonaphthol are diazotized in the usual manner by means of hydrochloric acid and 7 parts of sodium nitrite. The diazo compound is then poured into a solution of 240 parts of 1.8-dioxynaphthalene-4-sulfonic acid, to which an excess of sodium acetate has been added. When the reaction is complete the mixture is rendered alkaline by means of caustic soda lye and is then heated to about 50° C. for a short time. After cooling salt is added and the mixture is exactly neutralized with the aid of dilute hydrochloric acid. The dyestuff separates almost completely. It is pressed and dried. It is, after being dried and pulverized, a dark blue powder soluble in hot water with a bluish-violet color and in concentrated sulfuric acid with a blue color. By reduction with stannous chlorid and hydrochloric acid 1.8-aminonaphthol and 2-amino-1.8-dioxynaphthalene sulfonic acid is obtained.

The new dyestuff dyes wool from acid baths a violet shade which is changed to a bloomy violet-black, fast to potting and milling, when chromed after dyeing.

Having now described my invention and in what manner the same is to be performed, what I claim as new and desire to secure by Letters Patent is:—

The herein-described new azo-dyestuff, which can be obtained from 1.8-aminonaphthol and 1.8-dioxynaphthalene-4-sulfonic acid, which dyestuff is, after being dried and pulverized, a dark blue powder soluble in hot water with a bluish-violet color and in concentrated sulfuric acid with a blue color; yielding upon reduction with stannous chlorid and hydrochloric acid 1.8-aminonaphthol and 2-amino-1.8-dioxynaphthalene sulfonic acid; and dyeing wool from acid baths violet shades which are changed to violet-black when chromed after dyeing, substantially as hereinbefore described.

In testimony whereof I have hereunto set my hand in presence of two subscribing witnesses.

ALFRED BERGDOLT.

Witnesses:
  OTTO KÖNIG,
  WM. WASHINGTON BRUNSWICK.